Nov. 16, 1937.　　　　　R. F. BEAN　　　　　2,099,554
SHIFTABLE BRUSH RIGGING
Filed March 16, 1937　　　2 Sheets-Sheet 1
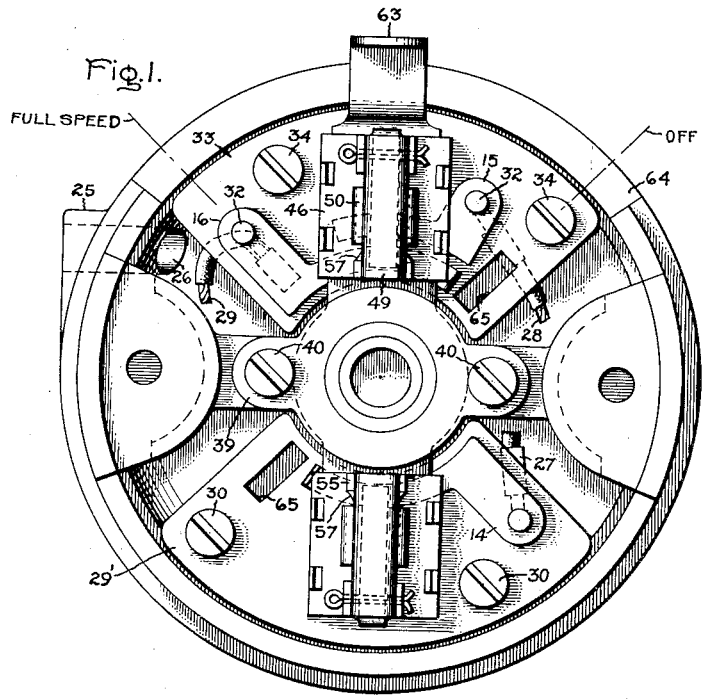
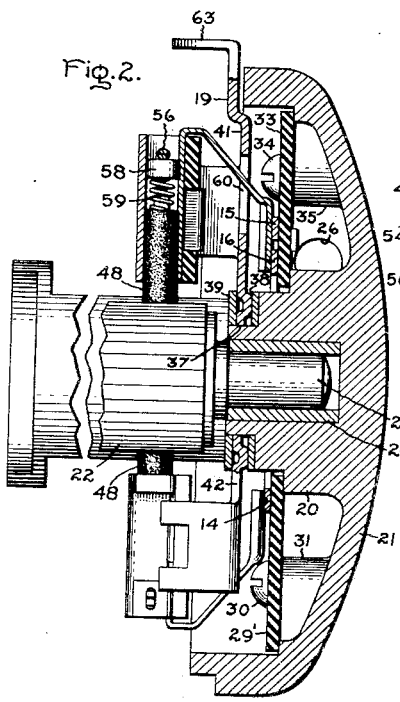
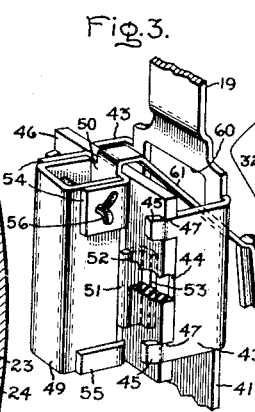
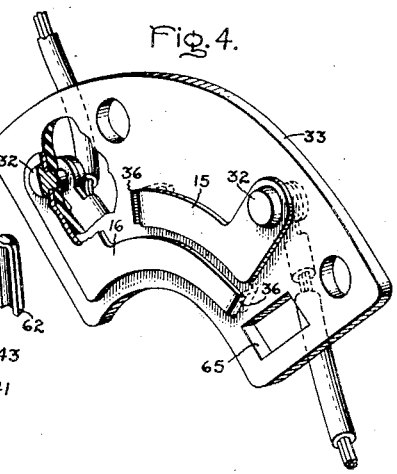
Inventor:
Robert F. Bean,
by Harry E. Dunham
His Attorney.

Nov. 16, 1937.  R. F. BEAN  2,099,554
SHIFTABLE BRUSH RIGGING
Filed March 16, 1937  2 Sheets—Sheet 2
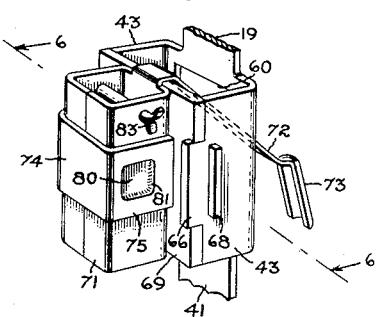
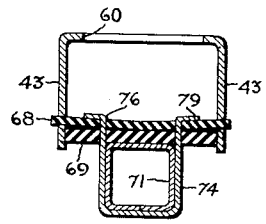
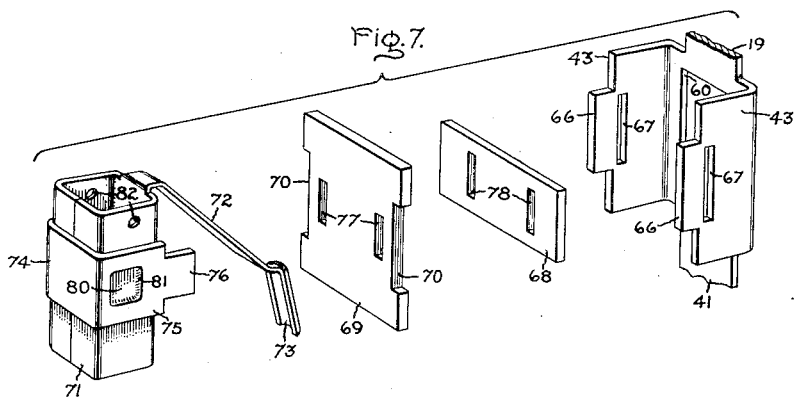
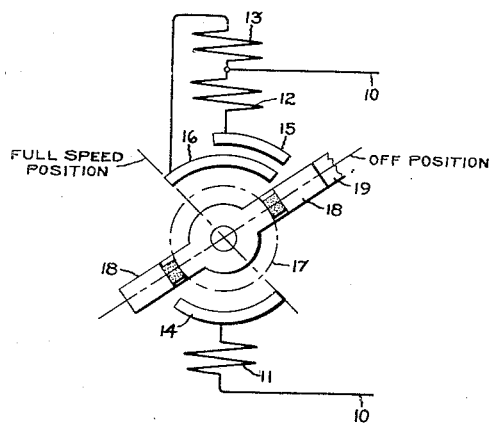
Inventor:
Robert F. Bean,
by Harry E. Dunham
His Attorney.

Patented Nov. 16, 1937

2,099,554

UNITED STATES PATENT OFFICE 2,099,554

SHIFTABLE BRUSH RIGGING

Robert F. Bean, Bridgeport, Conn., assignor to General Electric Company, a corporation of New York Application March 16, 1937, Serial No. 131,195

14 Claims. (Cl. 171—323)

My invention relates to dynamo-electric machines, and more particularly to an improved and simplified shiftable brush rigging for such machines.

In certain types of dynamo-electric machines, it has been found desirable to control the speed or voltage of the machine by changing the angular relation of the brushes with respect to the magnetic axis of the stationary member of the machine. The control of the voltage or speed of dynamo-electric machines is also readily obtainable by varying the excitation of the machine, and this may be accomplished by changing the field connections of the machine. Considerable variation and control of the voltage or speed of a dynamo-electric machine may be obtained by the use of a shiftable brush rigging, which varies the angular relation of the brushes with respect to the magnetic axis of the stationary member, and also varies the excitation of the machine by changing the field connections of the machine.

An object of my invention is to provide an improved and simplified brush rigging for a dynamo-electric machine.

Further objects and advantages of my invention will become apparent and my invention will be better understood from the following description referring to the accompanying drawings, and the features of novelty which characterize my invention will be pointed out with particularity in the claims annexed to and forming part of this specification.

For a better understanding of my invention, reference is made to the accompanying drawings, wherein Fig. 1 is an end elevational view of a brush rigging embodying my invention, mounted on the end shield of a dynamo-electric machine; Fig. 2 is a partial sectional side elevation of the brush rigging illustrated in Fig. 1 as applied to a dynamo-electric machine, partly broken away; Fig. 3 is a perspective view, partly broken away, of the upper arm and brush holder of the brush rigging shown in Fig. 1; Fig. 4 is a perspective view, partly broken away, of the upper contacts and insulating plate of the brush rigging shown in Fig. 1; Fig. 5 is a perspective view of a brush holder and mounting member of a brush rigging made according to another embodiment of my invention; Fig. 6 is a sectional view along line 6—6 of Fig. 5; Fig. 7 is an exploded view of the elements comprising the brush holder and a portion of the mounting member illustrated in Fig. 5; and Fig. 8 is a diagram illustrating the connections and the arrangement of a shiftable brush rigging embodying my invention.

In the drawings, I have shown in Fig. 8 a dynamo-electric machine connected to a source of electrical power supply 10, and provided with three field exciting windings 11, 12, and 13, each connected in series between the source of electrical power supply and electrically conductive contact elements 14, 15 and 16, respectively. All three of these field exciting windings produce a cumulative excitation effect. The dynamo-electric machine is provided with a rotatable member or armature having a commutator 17. Electrically conductive brush holders 18 are mounted upon a shiftable mounting member 19 which is supported upon the stationary member of the dynamo-electric machine for limited rotational movement about the axis of the armature. The shiftable brush holders are so arranged that in the off position, shown in Fig. 8, the mounting member 19 is rotated to its extreme position, and the circuit is broken between the brush holders 18 and the contact elements 14, 15, and 16, connected to the field exciting windings. In this position, the connection between the external circuit 10 and the armature and field exciting windings is open. Upon moving the mounting member 19 from its off position towards its full speed position, a circuit is first completed through the brushes between the external circuit 10, the field exciting winding 11, the armature brushes, and the field exciting windings 12 and 13, connected in parallel to the terminal of the external circuit. On further adjustment of the brushes 18 towards the full speed position, the angular position of the brushes is shifted with respect to the magnetic axis of the field exciting windings and the speed of the dynamo-electric machine, when operating as a motor, is increased, or the voltage of the machine operating as a generator also is increased. When the brushes are substantially on the neutral position with respect to the magnetic axis of the stationary member of the machine, further movement of the brushes towards the full speed position cuts out of the circuit the field exciting winding 12, thereby lowering the field excitation of the machine and producing a resultant increase in motor speed, and decrease in generator voltage. Further adjustment from this position provides a variation in the motor speed or generator voltage by adjustment of the position of the brushes with respect to the magnetic axis of the stationary member, and the machine operates with partial excitation of its field exciting windings in series with the armature, and across the external circuit. Thus, a simple arrangement is provided for adjusting the speed or voltage of the dynamo-electric machine over a wide range of operation.

In order to provide this type of shiftable brush rigging, I have found it desirable to eliminate the usual pig-tail connection between the commutator brushes and the terminal to which the external circuit is connected, and to support the mounting member for the brush holders for limited rotational movement about the axis of the rotatable member of the dynamo-electric machine. In Figs. 1 to 4, inclusive, I have shown a brush rigging which is adjustably mounted for limited rotational movement upon a hub 20 on the inside of a dynamo-electric machine end shield 21. The dynamo-electric machine is provided with a rotatable member having a commutator 22 mounted upon a shaft 23 which is supported in a bearing 24. The bearing is arranged coaxially within the hub 20, and is supported thereby on the end shield 21. The end shield is provided with a boss 25 having an opening 26 therein communicating with the inside of the end shield and forming a passage for the attachment cord of the dynamo-electric machine. This attachment cord is not shown in the drawings, but is schematically illustrated by 10 in Fig. 8, and is directly connected to one of the terminals of each of the field exciting windings 11, 12, and 13. The other terminals of the field exciting windings 11, 12 and 13 are connected by leads 27, 28, and 29, to the electrical conductive contact elements 14, 15 and 16, respectively. These contact elements are arcuate in shape about a center on the axis of the bearing supporting the rotatable member. The lower contact element 14 is supported on an arcuate plate of electrical insulating material 29′ which is mounted on the inside of the end shield 21 and secured in position by a pair of screws 30 which are threaded into bosses 31 formed on the inside of the end shield. Similarly, the contact elements 15 and 16 are secured by rivets 32 to an arcuate electrical insulating plate 33, which is supported on the inside of the end shield 21 by screws 34 threaded into bosses 35 in a diametrically opposite position to the insulating plate 29′. The contact elements are formed of metal strips, and the ends thereof which are not secured to the insulating plate by rivets extend through openings 36 formed in the insulating plates, and are bent over into clamping engagement therewith.

The mounting member 19 of the brush rigging is provided with a central opening 37 engaging a shoulder 38 formed on the hub 20, and is retained in position by a plate 39 which is attached to the end shield by screws 40. This mounting member is a sheet metal stamping having two radially extending arms 41 and 42 extending in diametrically opposite directions from the central opening 37. Each of these arms is provided with a pair of parallel flanges 43 extending substantially at right angles to the arms parallel to the axis of the dynamo-electric machine, thereby forming a U-shaped brush holder support. A notch 44 is formed in the outer edge of each of the flanges 43 providing a lug 45 on the outer corners of each of these flanges. In order to support a brush holder and insulate the same from the mounting member, a plate 46 of electrical insulating material is formed with a pair of notches 47 in each of two opposite edges thereof, and arranged with these notches 47 in engagement with the lugs 45, for positioning the insulating plate with respect to the flanges 43. The outer ends of the lugs 45 are bent about the outer surface of the insulating plate 46 into clamping engagement therewith for securing the insulating plate 46 to the flanges.

I provide a fabricated brush holder mounted on each of the insulating plates for holding a carbon brush 48 in contact with the commutator 22. This brush holder comprises a channel member 49 and a mounting plate 50 provided with a pair of lugs 51 which extend through openings 52 formed in the insulating plate 46. The lugs 51 provide clamping elements for securing the brush holder to the insulating plate, and the outer ends 53 thereof are bent into clamping engagement with the inside of the insulating plate 46, so as to retain the brush holder in position upon this plate. The mounting plate 50 is provided with a pair of complementary ears 54 and 55 at the upper and lower ends thereof, forming U-shaped mounting elements engaging the outer side of the flanges of the channel member, so that the plate 50 forms a closure for the open side of the channel 49 and provides a closed tubular brush holder. The complementary ears 54 are secured to the channel member 49 by a cotter pin 56, and the complementary ears 55 are soldered at 57 to the sides of the channel member 49. This arrangement facilitates assembly of the fabricated brush holder as the cotter pin 56 retains the brush holder in assembled relation, and makes it convenient for the soldering of the ears 55 thereto. The cotter pin 56 also serves as a limiting stop for a spring seat 58, which is engaged by the end of a spring 59 arranged to resiliently urge the brush 48 into engagement with the commutator 22. Each of the arms of the mounting member 19 is formed with an opening 60 therein intermediate the flanges 43, and the mounting plate 50 is provided with an arm 61 extending through the opening 60 in spaced relation with respect to the edges of the opening so as to prevent any electrical connection between the arm 61 and the mounting member 19. The lower end of the arm 61 is provided with a portion formed with a curved surface 62 to provide a good sliding contact face arranged to cooperate with the stationary contacts 14, or 15 and 16. In order to provide for the shifting of the brushes, the mounting member 19 is provided with an adjusting handle comprising a projection 63 thereof, extending beyond the periphery of the end shield 21 and through an arcuate slot 64 formed in a portion of the edge of the end shield 21. In order to insure that the brushes will remain in the off position when the mounting member has been shifted to this position, radially extending openings 65 are formed in the insulating plates 29′ and 33, so that the curved portions 62 engage these openings in the off position and prevent accidental shifting of the brushes from this position.

In the modification of a brush holder embodying my invention shown in Figs. 5, 6 and 7, the parallel flanges 43 of the mounting member 19 have both of the outer corners of each flange cut away, thereby forming a longitudinally extending lug 66 along the middle of the outer edge of each of these flanges. An opening or slot 67 is formed in each of the flanges 43 directly below the middle of the lug 66, and a plate 68 of electrical insulating material is arranged with the opposite ends thereof extending through the slots 67 in the complementary flanges 43. In order to support a brush holder and insulate the same from the mounting member, a plate 69 of electrical insulating material is formed with a notch 70 in each of two opposite edges thereof, and is arranged with these notches 70 in engagement with the lugs 66 for positioning the insulating plate 69 with respect to the flanges 43. A fabricated brush holder comprising a sheet metal tubular member 71 is provided with an arm 72 extending through the opening 60 formed in the arm 41 between the complementary flanges 43 and extends in spaced relation with respect to the edges of the opening, so as to prevent any electrical connection between the arm 72 and the mounting member 19. The free end of the arm 72 is provided with a portion formed with a curved surface 73 to provide a good sliding contact face arranged to cooperate with the stationary contacts supported on the end shield. The arm 72 and contactor 73 function in the same manner as the arm 61 and contactor 62 in the embodiment of my invention shown in Figs. 1, 2 and 3. The brush holder 71 is secured in position by a U-shaped clamp 74 which extends about the brush holder 71. The outer edge of each of the arms 75 of clamp 74 is provided with a lug 76 which projects through an opening 77 formed in the insulating plate 69 and an opening 78 formed in the insulating plate 68 in alignment with the opening 77. The outer ends 79 of the lugs 76 are bent into clamping engagement with the inner side of the insulating plate 68, and securely clamp together the insulating plates 68 and 69 and the brush holder 71. By clamping together the insulating plates 68 and 69, these plates securely engage the outer ends of the flanges 43 and secure the brush holder 71 in position with respect to the mounting member 19. In order to insure against displacement of the brush holder 71 with respect to the clamping element 74, the arms 75 are formed with openings 80 therein and the inner edges of these openings are soldered at 81 to the sides of the brush holder 71. Small openings 82 are formed near the upper edge of the two opposite sides of the brush holder 71 which are engaged by the arms of the U-shaped clamping member and a cotter pin 83 is inserted in these openings to provide a limiting stop for a spring seat, in the same manner as the cotter pin 56, in Fig. 2.

Thus, it is seen that I have provided a simplified fabricated brush rigging for a dynamo-electric machine, which is adapted to control the speed or voltage thereof by shifting the brushes and by varying the field connections of the machine.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:—

1. A brush rigging comprising a mounting member provided with flanges forming a U-shaped brush holder support, a plate of electrical insulating material having an opening therein, means for securing said insulating plate to said flanges, a brush holder, and a clamping element secured to said brush holder having a lug extending through said opening in said insulating plate and arranged in clamping engagement therewith.

2. A brush rigging comprising a sheet-metal mounting member provided with flanges forming a U-shaped brush holder support, a plate of electrical insulating material having a plurality of openings therein, means for securing said insulating plate to said flanges, a sheet-metal brush holder, a sheet-metal clamping element secured to said brush holder and engaging one side of said insulating plate, and lugs formed on said clamping element extending through openings in said insulating plate and arranged in clamping engagement therewith.

3. A brush rigging comprising a mounting member provided with flanges forming a U-shaped brush holder support, a plate of insulating material having an opening therein, a notch formed in each of two opposite edges of said insulating plate and arranged to engage said flanges of said U-shaped support for positioning said insulating plate with respect thereto, means for securing said insulating plate to said flanges, a metal brush holder having a clamping element extending through said opening in said insulating plate and arranged in clamping engagement therewith.

4. A brush rigging comprising a mounting member provided with flanges forming a U-shaped brush holder support, said U-shaped brush holder support having an opening therein between said flanges, a plate of electrical insulating material having an opening therein, means for securing said insulating plate to said flanges, a metal brush holder including an electrical contactor extending through said opening in said brush holder support and having a clamping element engaging one side of said insulating plate, and a lug formed on said clamping element extending through said opening in said insulating plate and arranged in clamping engagement therewith.

5. A brush rigging comprising a mounting member provided with flanges forming a U-shaped brush holder support, a plate of electrical insulating material having an opening therein and having notches formed in each of two opposite edges thereof, means including lugs formed on the outer edges of each of said flanges engaging said notches in said insulating plate and arranged in clamping engagement with said insulating plate, a brush holder, and a clamping element secured to said brush holder having a lug extending through said opening in said insulating plate and arranged in clamping engagement therewith.

6. A brush rigging comprising a mounting member provided with flanges forming a U-shaped brush holder support, a plate of electrical insulating material having an opening therein, means for securing said insulating plate to said arms, a brush holder including a channel member and a plate having ears forming a U-shaped element engaging said channel member, said U-shaped element having a lug extending through said opening in said insulating plate and arranged in clamping engagement therewith, and means for securing said U-shaped element to said channel member.

7. A brush rigging comprising a mounting member provided with flanges forming a U-shaped brush holder support, a plate of electrical insulating material having an opening therein and having notches formed in each of two opposite edges thereof, means including lugs formed on the outer edges of each of said flanges engaging said notches in said insulating plate and arranged in clamping engagement with said insulating plate, a brush holder including a channel member and a plate having ears forming a U-shaped element engaging said channel member, said U-shaped element having a lug extending through said opening in said insulating plate and arranged in clamping engagement therewith, and means for securing said U-shaped element to said channel member.

8. A brush rigging comprising a mounting member provided with flanges forming a U-shaped brush holder support, said brush holder support having an opening therein between said flanges, a plate of electrical insulating material formed with an opening therein and having notches formed in each of two opposite edges thereof, means including lugs formed on the outer edges of said flanges engaging said notches in said insulating plate and arranged in clamping engagement with said insulating plate, and a metal brush holder including a channel member and a plate having ears forming a U-shaped element engaging said channel member, said U-shaped element having an electrical contactor extending through said opening in said brush holder support and a lug extending through said opening in said insulating plate and arranged in clamping engagement therewith.

9. A brush rigging comprising a mounting member provided with flanges forming a U-shaped brush holder support, a plate of electrical insulating material having an opening therein and having notches formed in each of two opposite edges thereof, lugs formed on the outer edges of each of said flanges engaging said notches in said insulating plate, each of said flanges having an opening therein adjacent said lugs, a second plate of insulating material arranged in engagement with said openings in said flanges and having an opening therein arranged in alignment with said opening in said first-mentioned insulating plate, a brush holder, a clamping element secured to said brush holder having a lug extending through said openings in said insulating plates and arranged in clamping engagement therewith.

10. A brush rigging comprising a mounting member provided with flanges forming a U-shaped brush holder support, a plate of electrical insulating material formed with an opening therein and having notches formed in each of two opposite edges thereof, lugs formed on the outer edges of each of said flanges engaging said notches in said insulating plate, each of said flanges having an opening therein adjacent said lugs, a second plate of insulating material arranged in engagement with said openings in said flanges and having an opening therein arranged in alignment with said opening in said first-mentioned insulating plate, a brush holder, and a U-shaped clamping element arranged about said brush holder extending through said openings in said insulating plates and arranged in clamping engagement therewith.

11. A brush rigging comprising a mounting member provided with flanges forming a U-shaped brush holder support, said brush holder support having an opening formed therein between said flanges, a plate of electrical insulating material having an opening therein and having notches formed in each of two opposite edges thereof, lugs formed on the outer edges of each of said flanges engaging said notches in said insulating plate, each of said flanges having an opening therein adjacent said lugs, a second plate of insulating material arranged in engagement with said openings in said flanges and having an opening therein arranged in alignment with said opening in said first-mentioned insulating plate, a metal brush holder including an electrical contactor extending through said opening in said brush holder, and a U-shaped clamping element arranged about said brush holder having a lug extending through said openings in said insulating plates and arranged in clamping engagement therewith.

12. In combination, a dynamo-electric machine having an end shield, a brush rigging comprising an insulating plate secured to said end shield, a plurality of arcuate electrically conductive elements mounted on said insulating plate, a mounting member rotatably supported on said end shield, said mounting member having an opening therein, a brush holder carried by said mounting member and including a contactor extending through said opening in said mounting member into engagement with said arcuate conductive elements.

13. In combination, a dynamo-electric machine having an end shield, a brush rigging comprising an insulating plate secured to said end shield, a plurality of arcuate electrically conductive elements mounted on said insulating plate, a mounting member rotatably supported on said end shield and provided with flanges forming a U-shaped brush holder support, said mounting member having an opening therein between said flanges, a second plate of electrical insulating material formed with an opening therein, means for securing said second insulating plate to said flanges, a brush holder including a contactor extending through said opening in said mounting member into engagement with said arcuate conductive elements and having a clamping element engaging one side of said second insulating plate, and a lug formed on said clamping element extending through said opening in said second insulating plate and arranged in clamping engagement therewith.

14. In combination, a dynamo-electric machine having an end shield, an arcuate slot formed in the edge of said end shield, a brush rigging comprising an electrically conductive element insulated from and mounted on said end shield, a mounting member rotatably supported on said end shield and having an opening therein, said mounting member having a projection thereof extending beyond the periphery of said end shield through said slot therein constituting an adjusting handle, a plate of electrically insulating material formed with an opening therein and secured to said mounting member, and a brush holder including an electric contactor extending through said opening in said mounting member into engagement with said electrically conductive element and being provided with a clamping element having a lug formed thereon extending through said opening in said insulating plate and arranged in clamping engagement therewith.

ROBERT F. BEAN.